United States Patent
Taru et al.

(10) Patent No.: US 6,728,458 B2
(45) Date of Patent: Apr. 27, 2004

(54) OPTICAL FIBER AND FIBER GRATING DEVICE

(75) Inventors: Toshiki Taru, Yokohama (JP); Shinji Ishikawa, Yokohama (JP); Akira Inoue, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 9 days.

(21) Appl. No.: 10/082,083

(22) Filed: Feb. 26, 2002

(65) Prior Publication Data

US 2002/0118939 A1 Aug. 29, 2002

(30) Foreign Application Priority Data

Feb. 28, 2001 (JP) ..................... P2001-055348

(51) Int. Cl.[7] .................................. G02B 6/22
(52) U.S. Cl. ................ 385/127; 385/37; 385/123; 385/124
(58) Field of Search ............ 385/37, 123–128, 385/141–145

(56) References Cited

U.S. PATENT DOCUMENTS

| | | | | |
|---|---|---|---|---|
| 5,881,197 A | * | 3/1999 | Dong et al. | 385/127 |
| 6,009,222 A | * | 12/1999 | Dong et al. | 385/127 |
| 6,307,994 B1 | * | 10/2001 | Paek et al. | 385/127 |

FOREIGN PATENT DOCUMENTS

| | | |
|---|---|---|
| JP | 7-281016 | 10/1995 |
| JP | 8-286060 | 11/1996 |
| JP | 8-290930 | 11/1996 |
| JP | 8-290931 | 11/1996 |
| JP | 8-290932 | 11/1996 |
| JP | 9-243848 | 9/1997 |
| JP | 11-211920 | 8/1999 |
| JP | 11-237514 | 8/1999 |

OTHER PUBLICATIONS

Victor Mizrahi and J E. Sipe, "Optical Properties of Photosensitive Fiber Phase Gratings", Journal of Lightwave Technology, vo 11, No. 10, pp. 1.513–1.517, Oct. 1993.*

A. Inoue. et al., "Optimization of Fiber Bragg Grating for Dense WDM Transmission System", IEICE Transactions on Electrons. vol. E81–C, No. 8. pp. 1209–1218, (1998).

* cited by examiner

*Primary Examiner*—John D. Lee
*Assistant Examiner*—Jennifer Doan (57) ABSTRACT

An optical fiber comprises a core region, an inner cladding region, and an outer cladding region. Each of the core region and inner cladding region is doped with $GeO_2$, whereas the inner cladding region is also doped with F element. The core region has a refractive index higher than each of the refractive index of the inner cladding region and the refractive index of the outer cladding region. Each of the core region and inner cladding region doped with $GeO_2$ has a UV photosensitivity. The deviation in concentration distribution of $GeO_2$ added to the inner cladding region is so small that the deviation in UV photosensitivity in the inner cladding region is ±10% or less.

5 Claims, 9 Drawing Sheets

OPTICAL FIBER AND FIBER GRATING DEVICE

BACKGROUND OF THE INVENTION

1. Field of the Invention

The present invention relates to a fiber grating device in which a refractive index modulation is formed in a predetermined region along the longitudinal direction of an optical fiber, and an optical fiber suitable for realizing this optical fiber grating device.

2. Related Background Art

A fiber grating device is a device in which a refractive index modulation is formed in a predetermined region along it the longitudinal direction of an optical fiber. This fiber grating device can selectively reflect light having a wavelength $\lambda_B$ which is represented by the expression of $\lambda_B = 2N \cdot \Lambda$, where N is the effective refractive index in the refractive index modulation region of the optical fiber, and $\Lambda$ is the period of refractive index modulation. As a consequence, the fiber grating device is used as an optical filter, a multi/demultiplexer, and the like in a wavelength division multiplexing optical communication system and the like.

Such a fiber grating device is made as follows. First, a silica optical fiber whose core region is doped with $GeO_2$ is made. The core region doped with $GeO_2$ has such a UV photosensitivity that its refractive index rises in proportion to the amount of UV irradiation. Therefore, when the optical fiber is irradiated with UV rays whose intensity is spatially modulated along the longitudinal direction of the optical fiber, a refractive index modulation corresponding to the intensity modulation of UV rays is formed in the core region. Thus, a fiber grating device is made.

SUMMARY OF THE INVENTION

The inventors studied the conventional technique mentioned above and, as a result, have found the following problems. Namely, in practice, such a fiber grating device not only reflects the light having the wavelength $\lambda_B$ but also causes a loss in light having other wavelengths (shorter than the wavelength $\lambda_B$) to be transmitted there through. This loss is known as a cladding mode coupling loss. The cladding mode coupling loss is assumed to occur due to the fact that a core mode light component having a specific wavelength shorter than the wavelength $\lambda_B$ couples with a cladding region mode light component since, while a part of energy of light propagating through the optical fiber exists in its cladding region, the refractive index modulation is formed only in the core region.

Since this phenomenon of cladding mode coupling loss causes a loss in the light having a wavelength intended to be transmitted through the fiber grating device, it has been desired that the cladding mode coupling loss be reduced. It has been known that the cladding mode coupling loss can be reduced when a refractive index modulation is formed not only in the core region but also in a part of the cladding region near the core region (see Japanese Patent Application Laid-Open No. HEI 11-237514, and a literature, A. Inoue, et al., "Optimization of Fiber Bragg Grating for Dense WDM Transmission System," IEICE Trans. Electron., Vol. E81-C, No. 8, pp. 1209–1218 (1998), for example). The conventional technique mentioned above, however, may not fully reduce the cladding mode coupling loss. The cladding mode coupling loss is only lowered to about 0.2 dB in the above-mentioned literature.

In order to overcome the problems mentioned above, it is an object of the present invention to provide a fiber grating device whose cladding mode coupling loss is reduced, and an optical fiber suitable for realizing such a fiber grating device.

The optical fiber in accordance with the present invention comprises (1) a core region having a first refractive index with a UV photosensitivity; (2) an inner cladding region surrounding the core region and having a second refractive index lower than the first refractive index with a UV photosensitivity; and (3) an outer cladding region surrounding the inner cladding region and having a third refractive index lower than the first refractive index. The UV photosensitivity in the inner cladding region has a deviation of ±10% or less. The fiber grating device in accordance with the present invention comprises the optical fiber in accordance with the present invention having a refractive index modulation formed in a predetermined region along the longitudinal direction thereof.

Since not only the core region but also the inner cladding region surrounding the core region has a UV photosensitivity, whereas the UW photosensitivity in the inner cladding region has a deviation of ±10% or less, the cladding mode coupling loss of the fiber grating device can fully be reduced. Here, "UV photosensitivity has a deviation of ±10% or less" means that the UV photosensitivity at each position in the region falls within the range of 90% to 110% with respect to the average value. Though there are cases where the UV photosensitivity drops in practice in the vicinity of the boundary between the core region and the inner cladding region, such a drop will be neglected if its diametric width is not greater than the wavelength in use since it is not problematic in terms of characteristics of the diffraction grating in this case.

Preferably, the difference between the average value of UV photosensitivity in the core region and the average value of UV photosensitivity in the inner cladding region is 10% or less. Also, it is preferred that the deviation in UV photosensitivity over both of the core region and inner cladding region be ±10% or less. It is further preferred that the deviation in UV photosensitivity over both of the core region and inner cladding region be ±5% or less. Each of these cases is suitable for fully reducing the cladding mode coupling loss of the fiber grating device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

In the following, an embodiment of the present invention will be explained in detail with reference to the accompanying drawings. In the explanation of the drawings, constituents identical to each other will be referred to with numerals identical to each other without repeating their overlapping descriptions.

Figures 1A, 1B:
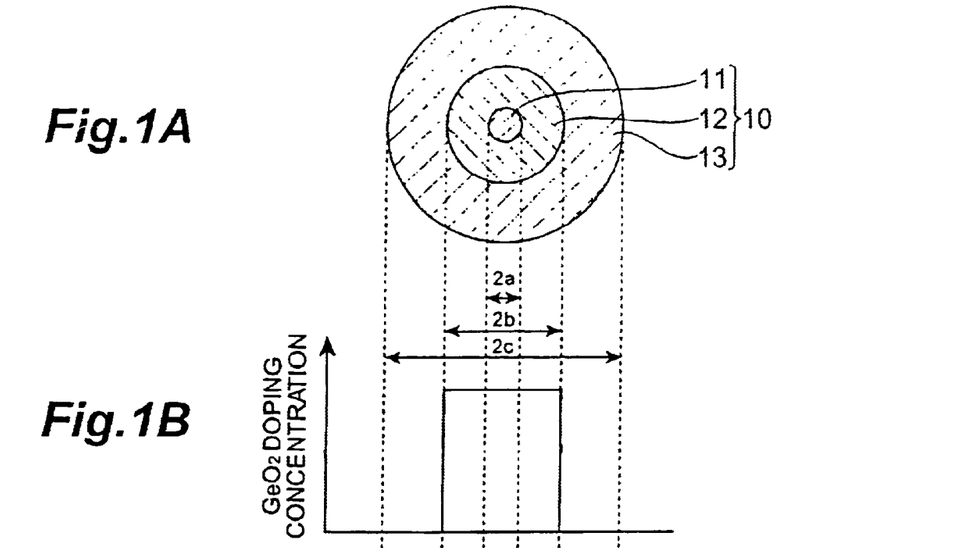
FIGS. 1A to 1E are views for explaining the optical fiber in accordance with an embodiment.
Figure 1C:
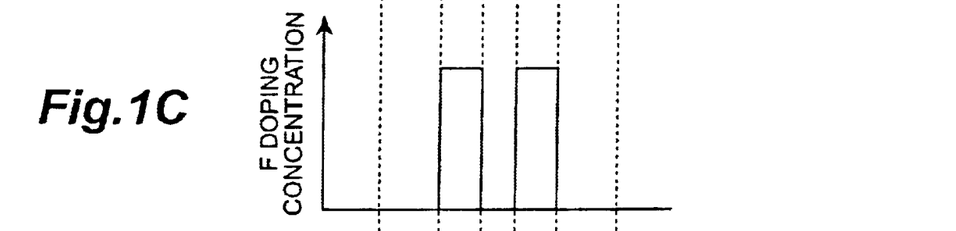
Figure 1D:
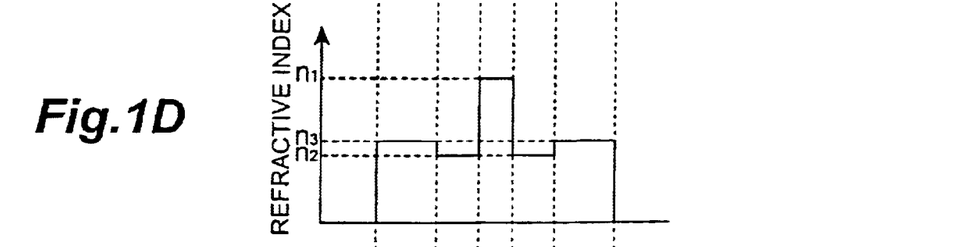
Figure 1E:
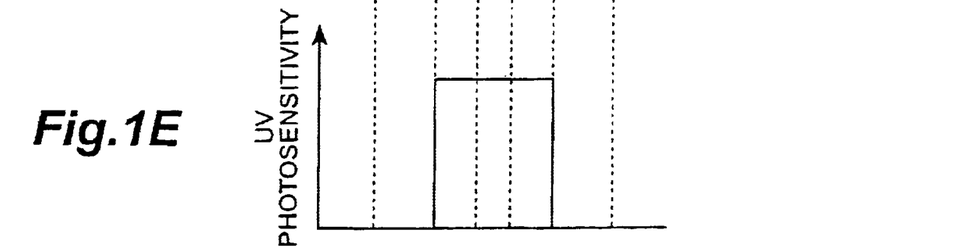

FIGS. 1A to 1D are explanatory views of the optical fiber 10 in accordance with the embodiment. FIG. 1A shows a cross-sectional structure of the optical fiber 10. FIG. 1B shows the $GeO_2$ doping concentration distribution in the optical fiber 10. FIG. 1C shows the F doping concentration distribution in the optical fiber 10. FIG. 1D shows the refractive index profile of the optical fiber 10. FIG. 1E shows the UV photosensitivity distribution in the optical fiber 10. FIG. 1A shows the a cross section of the optical fiber 10 cut along a plane orthogonal to the optical axis. In each of FIGS. 1B to 1E, the abscissa indicates positions of the optical fiber 10 on a line orthogonal to the optical axis.

The optical fiber 10 is a silica optical fiber and comprises, as shown in FIG. 1A, a core region 11, an inner cladding region 12 surrounding the core region 11, and an outer cladding region 13 surrounding the inner cladding region 12. In the optical fiber 10, each of the core region 11 and the inner cladding region 12 is doped with $GeO_2$ as shown in FIG. 1B, whereas the inner cladding region 12 is also doped with F element as shown in FIG. 1C.

The optical fiber 10 has the refractive index profile shown in FIG. 1D, so that the refractive index $n_1$ of the core region 11 is higher than each of the refractive index $n_2$ of the inner cladding region 12 and the refractive index $n_3$ of the outer cladding region 13. The refractive index $n_2$ of the inner cladding region 12 and the refractive index $n_3$ of the outer cladding region 13 can be equal to each other. In the optical fiber 10, each of the core region 11 and inner cladding region 12 doped with $GeO_2$ has a UV photosensitivity as shown in FIG. 1E.

In the optical fiber 10 in accordance with this embodiment, in particular, the deviation in concentration distribution of $GeO_2$ added to the inner cladding region 12 is so small that the deviation of UV photosensitivity in the inner cladding region 12 is ±10% or less. Preferably, the deviation in concentration distributions of $GeO_2$ added to the core region 11 and inner cladding region 12 is so small that the difference between the average value of UV photosensitivity in the core region 11 and the average value of UV photosensitivity in the inner cladding region 12 is 10% or less, or the deviation in UV photosensitivity over both of the core region 11 and inner cladding region 12 is ±10% or less. It is further preferred that the deviation in UV photosensitivity over both of the core region 11 and inner cladding region 12 is ±5% or less.

On the other hand, the outer diameter of the core region 11 is $2a$, the outer diameter of the inner cladding region 12 is $2b$, and the outer diameter of the outer cladding region 13 (i.e., the outer diameter of the optical fiber 10) is $2c$. The outer diameter $2c$ of the outer cladding region 13 is 125 μm in general. The ratio (b/a) between the respective outer diameters of the core region 11 and inner cladding region 12 is preferably 2 to 5, more preferably 3 to 4.

An optical fiber preform for yielding such an optical fiber 10 upon drawing is made as follows. First, a core rod ($GeO_2$—$SiO_2$) to become the core region 11 after drawing is prepared according to the following first or second method. In the first method, a core precursor made of silica glass doped with $GeO_2$ is prepared by VAD (Vapor phase Axial Deposition) method, the outer periphery of the core precursor is ground so as to yield a $GeO_2$ concentration deviation of ±10% or less in the diametric direction thereof, and thus ground core precursor is used as a core rod. In the second method, the outer peripheral face of the core rod prepared by the first method is deposited with fine particles of $GeO_2$—$SiO_2$ by OVD (Outside Vapor phase Deposition) method, thus obtained soot body is consolidated and elongated, and the outer peripheral face of thus elongated body is etched with HF, whereby a core rod is prepared. The second method is advantageous in that it is excellent in manufacturing efficiency and in that it yields a $GeO_2$ concentration deviation smaller than that in the first method.

On the other hand, a soot body of an inner cladding rod to become the inner cladding region 12 after drawing is prepared on the outer periphery of the core rod by OVD method. In deposition by OVD method, for example, $SiCl_4$ and $GeCl_4$ are fed from a burner, whereas the amount of $SiCl_4$ supplied from the burner is gradually reduced from a certain point of time. For example, the number of turns of the burner is 300, and the amount of $SiCl_4$ supplied from the burner is linearly reduced from the 120th turn. The amount of $SiCl_4$ supplied from the burner at the final turn is 62% of that initially supplied. The amount of $GeCl_4$ supplied from the burner is kept constant through all the turns. The surface temperature at the time of sooting is 580° C. to 590° C. Thus obtained soot body is consolidated in an $SiF_4$ atmosphere, whereby an inner cladding rod ($GeO_2$—F—$SiO_2$) to become the inner cladding region 12 after drawing is prepared.

Then, the inner cladding rod is inserted into a silica jacket pipe and collapsed, or a soot body ($SiO_2$) is prepared on the outer peripheral face of the inner cladding rod by OVD or VAD method and is consolidated/elongated, whereby an optical fiber preform is made. This optical fiber preform is drawn, whereby the above-mentioned optical fiber 10 is made. In the optical fiber 10 made by the foregoing method, for example, the outer diameter $2a$ of the core region 11 is 9 μm, whereas the outer diameter $2b$ of the inner cladding region 12 is 32 μm. With reference to the refractive index $n_3$ of the outer cladding region 13, the relative refractive index difference of the core region 11 is about 0.35%.

Figure 2:
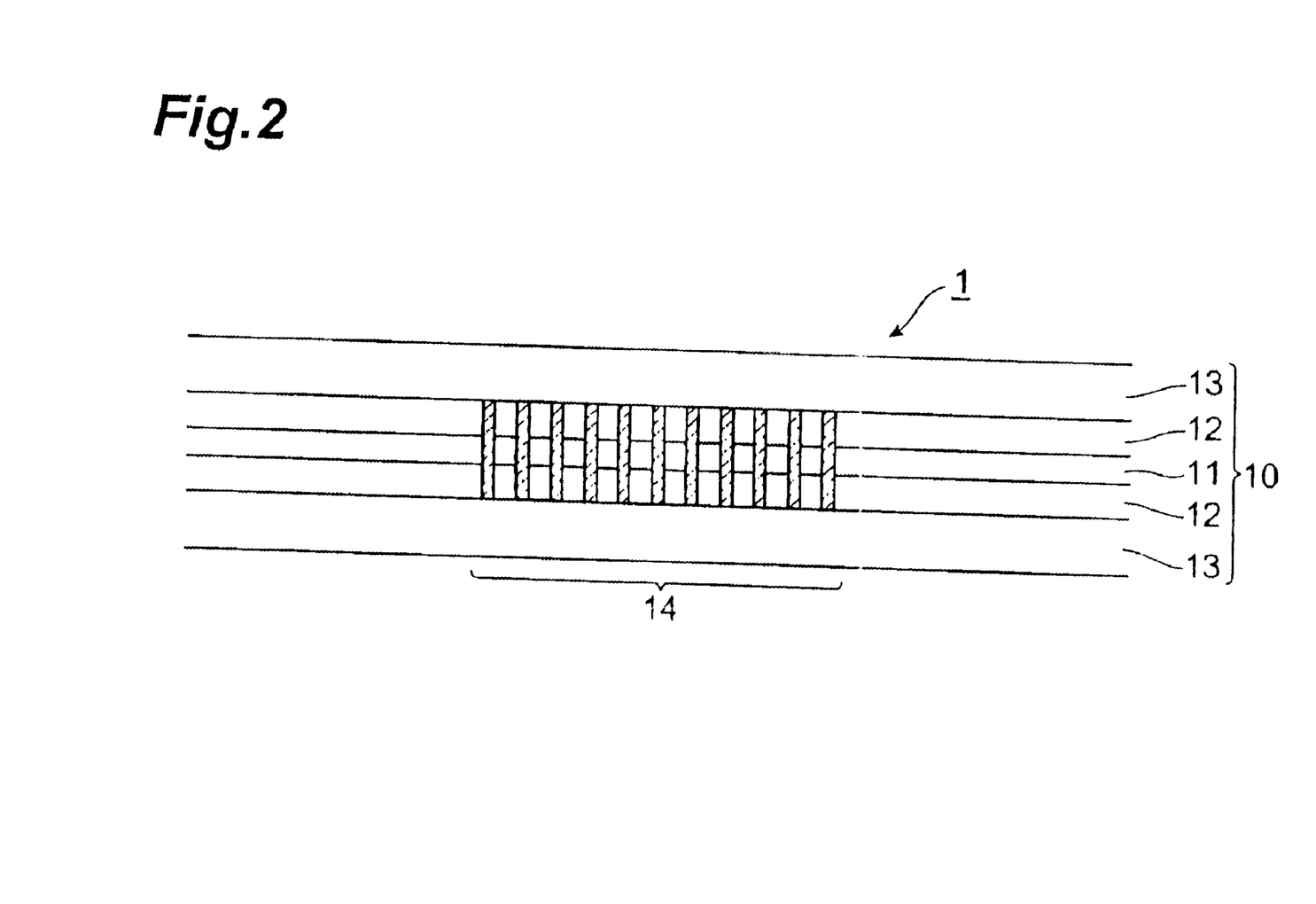
FIG. 2 is a view showing a cross section of the fiber grating device in accordance with the embodiment.

FIG. 2 is a view showing a cross section of the fiber grating device 1 in accordance with the embodiment. This drawing shows the cross section obtained when the fiber grating device 1 is cut along a plane including the optical axis. The fiber grating device 1 is one in which a refractive index modulation is formed over both of the core region 11 and inner cladding region 12 having a UV photosensitivity in a predetermined region (refractive index modulation region) 14 along the longitudinal direction of the optical fiber 10. In this drawing, hatched areas indicate those where refractive index rises in the refractive index modulation region 14. Such a fiber grating device 1 is made when the optical fiber 10 is irradiated by two-beam interference method or phase mask method with UV rays whose intensity is spatially modulated along the longitudinal direction. In the fiber grating device 1, a refractive index modulation is formed in a predetermined area along the longitudinal direction of the optical fiber 10 in which both of the core region 11 and the inner cladding region 12 have a UV photosensitivity whereas the deviation of UV photosensitivity in the inner cladding region 12 is ±10% or less. Therefore, the fiber grating device 1 can fully reduce the cladding mode coupling loss.

Relationships between respective UV photosensitivity distributions in the core region 11 and inner cladding region 12 in the optical fiber 10 and the cladding mode coupling loss in the fiber grating device 1 will now be explained with reference to FIGS. 3A to 3D, 4, and 5.

Figure 3A:
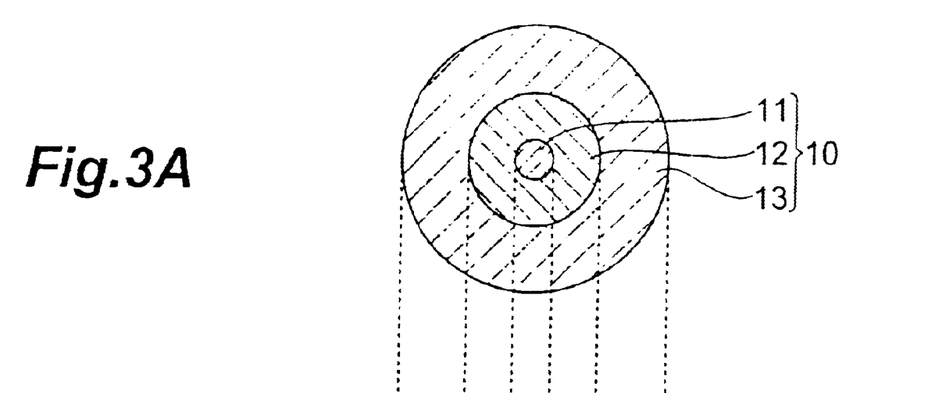
FIGS. 3A to 3D are views for further explaining UV photosensitivity distributions in the optical fiber in accordance with the embodiment.
Figure 3B:
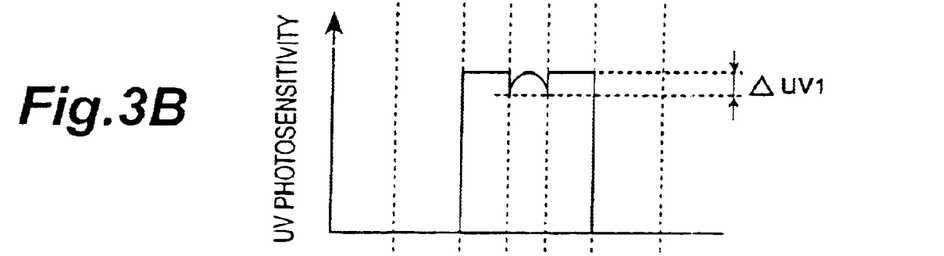
Figure 3C:
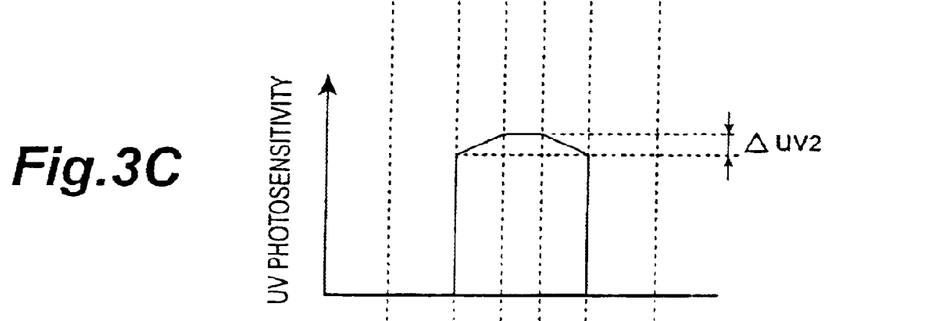
Figure 3D:
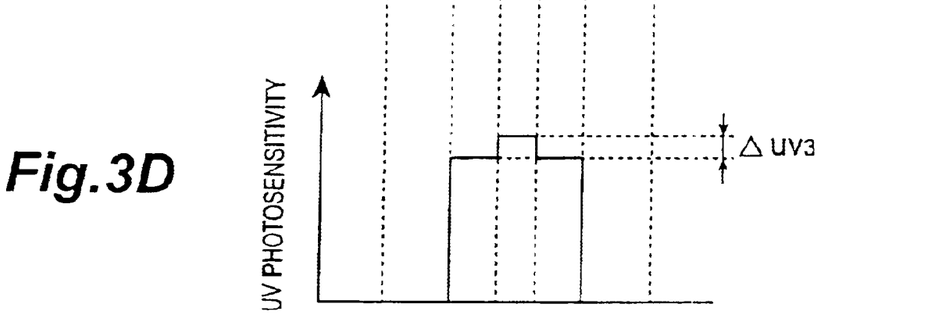

FIGS. 3A to 3D are views for further explaining UV photosensitivity distributions in the optical fiber 10 in accordance with the embodiment. FIG. 3A shows a cross-sectional structure of the optical fiber 10. FIGS. 3B to 3D show respective UV photosensitivity distributions in the optical fiber 10. The UV photosensitivity distribution shown in FIG. 3B is represented by a quadratic curve yielding a maximum value at the center position in the core region 11, and by a constant value (equal to the above-mentioned maximum value) in the inner cladding region 12, whereas the deviation in the core region 11 is $\Delta_{UV1}$ (hereinafter referred to as "condition 1"). The UV photosensitivity distribution shown in FIG. 3C is at a constant value in the core region 11, but decreases in proportion to the distance from the center in the inner cladding region 12, whereas the deviation in the inner cladding region 12 is $\Delta_{UV2}$ (hereinafter referred to as "condition 2"). The UV photosensitivity distribution shown in FIG. 3D is at a constant value in the core region 11, and at a constant value (lower than that in the core region 11) in the inner cladding region 12, whereas the difference therebetween is $\Delta_{UV3}$ (hereinafter referred to as "condition 3"). The UV photosensitivity distribution shown in FIG. 1E is an ideal one yielding a constant value over both of the core region 11 and inner cladding region 12 (hereinafter referred to as "basic condition").

Figure 4:
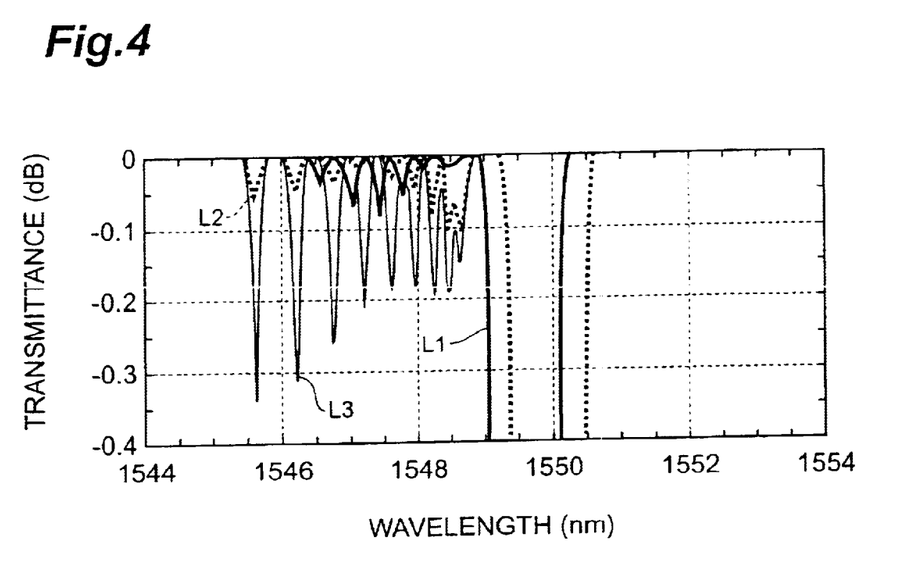
FIG. 4 is a view showing transmission spectra of the fiber grating device in accordance with the embodiment.

FIG. 4 is a view showing transmission spectra (simulated results) of the fiber grating device 1 in accordance with the embodiment. Lines L1 to L3 in FIG. 4 show respective transmission spectra of the fiber grating device 1 in the cases of conditions 1 to 3 mentioned above. Here, the refractive index modulation in the fiber grating device 1 is set such that the maximum refractive index change in the center part of the core region 11 is 1×10$^{-3}$. Each of the deviations $\Delta_{UV1}$, $\Delta_{UV2}$, and $\Delta_{UV3}$ in UV photosensitivity in the cases of conditions 1, 2, and 3 is ±10%. As can be seen from this view, the cladding mode coupling loss is reduced to about 0.1 dB in the cases of conditions 1 and 2 where the difference between the respective average values of UV photosensitivity in the core region 11 and inner cladding region 12 is small.

Figure 5:
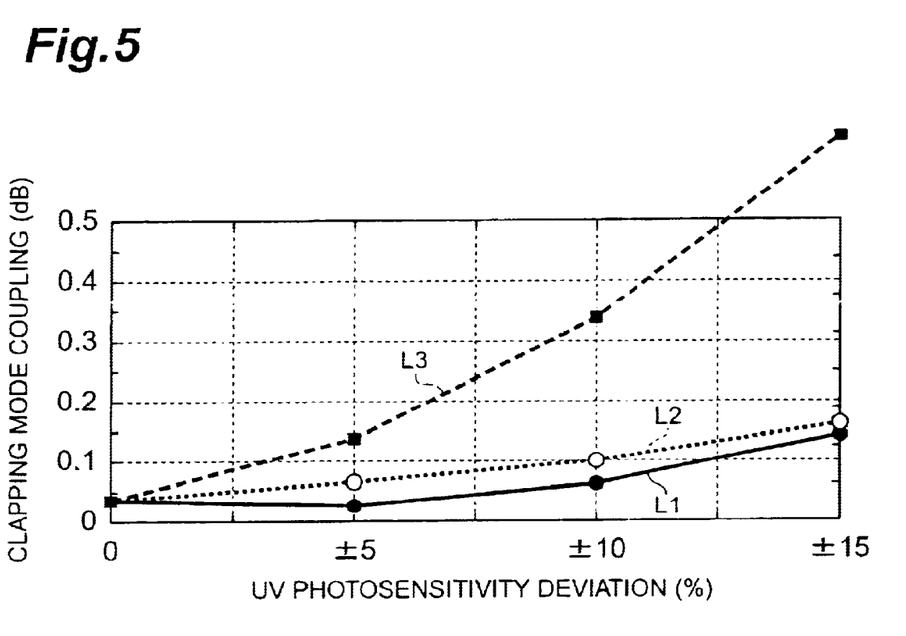
FIG. 5 is a graph showing relationships between cladding mode coupling loss and deviations in UV photosensitivity distribution of the fiber grating device in accordance with the embodiment.

FIG. 5 is a graph showing relationships (simulated results) between the cladding mode coupling loss of the fiber grating device 1 in accordance with this embodiment and deviations of UV photosensitivity distributions. In FIG. 5, lines L1 to L3 show respective cases of conditions 1 to 3 mentioned above. As can be seen from this graph, the cladding mode coupling loss of the fiber grating device 1 is about 0.03 dB when the deviation of UV photosensitivity distribution is zero (i.e., in the case of basic condition), and becomes greater as the deviation of UV photosensitivity distribution increases. In the case of condition 1, the maximum value of cladding mode coupling loss in the fiber grating device 1 is about 0.02 dB when the deviation $\Delta_{UV1}$ of UV photosensitivity is ±5%. The maximum value of cladding mode coupling loss is about 0.07 dB when the deviation $\Delta_{UV1}$ of UV photosensitivity is ±10%. The maximum value of cladding mode coupling loss is about 0.14 dB when the deviation $\Delta_{UV1}$ of UV photosensitivity is ±15%. In the case of condition 2, the maximum value of cladding mode coupling loss in the fiber grating device 1 is about 0.07 dB when the deviation $\Delta_{UV2}$ of UV photosensitivity is ±5%. The maximum value of cladding mode coupling loss is about 0.10 dB when the deviation $\Delta_{UV2}$ of UV photosensitivity is ±10%. The maximum value of cladding mode coupling loss is about 0.17 dB when the deviation $\Delta_{UV2}$ of UV photosensitivity is ±15%. In the case of condition 3, the maximum value of cladding mode coupling loss in the fiber grating device 1 is about 0.13 dB when the deviation $\Delta_{UV3}$ of UV photosensitivity is ±5%. The maximum value of cladding mode coupling loss is about 0.33 dB when the deviation $\Delta_{UV3}$ of UV photosensitivity is ±10%. The maximum value of cladding mode coupling loss is about 0.7 dB when the deviation $\Delta_{UV3}$ of UV photosensitivity is ±15%.

Thus, except for condition 3, the maximum value of cladding mode coupling loss in the fiber grating device 1 can be reduced to about 0.1 dB or less if the deviation of UV photosensitivity is within ±10%. Also, as in the simulated result of condition 3, it is necessary for the deviation to fall within ±3% in order to suppress the maximum value of cladding mode coupling loss to about 0.1 dB when a large difference occurs in the average value of Ge concentration between the whole core and the whole inner cladding.

An example of the fiber grating device 1 in accordance with the embodiment will now be explained together with a comparative example.

Figure 6:
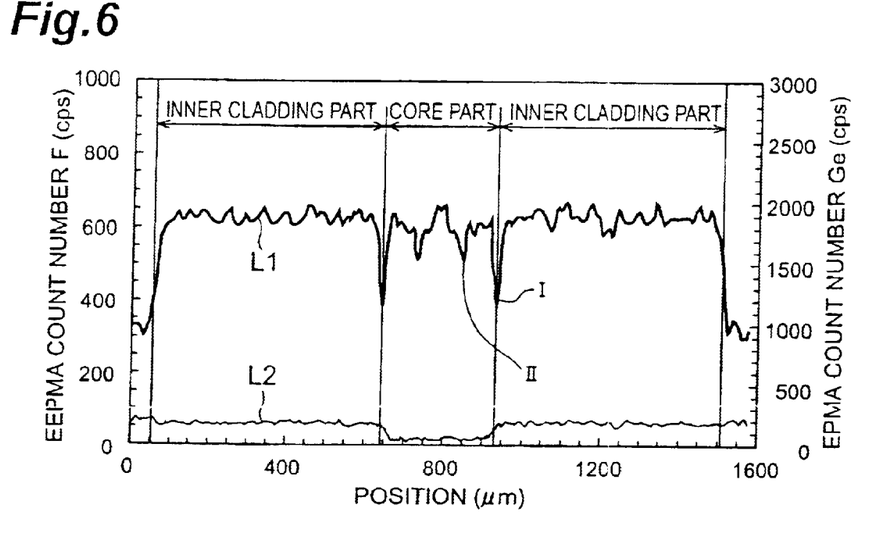
FIG. 6 is a view showing respective diametric concentration distributions of elements of an optical fiber preform for the fiber grating device in accordance with an example.
Figure 7:
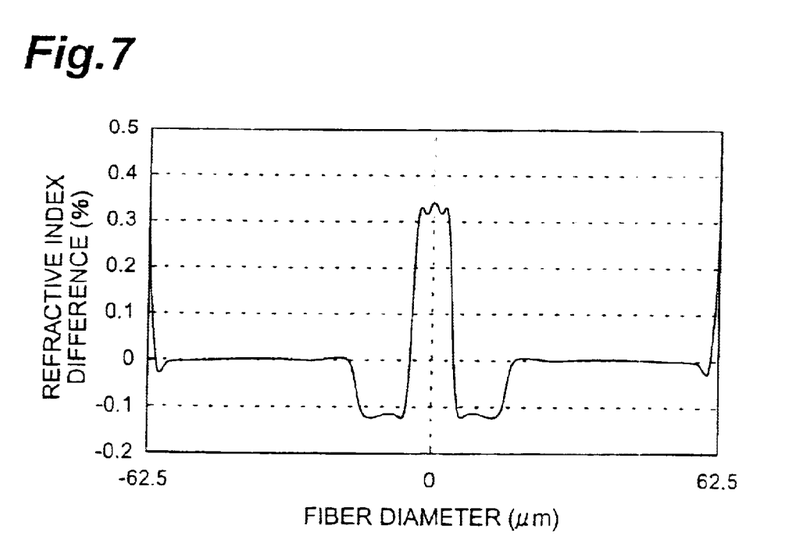
FIG. 7 is a view showing the diametric refractive index distribution of the optical fiber for the fiber grating device in accordance with the example.
Figure 8:
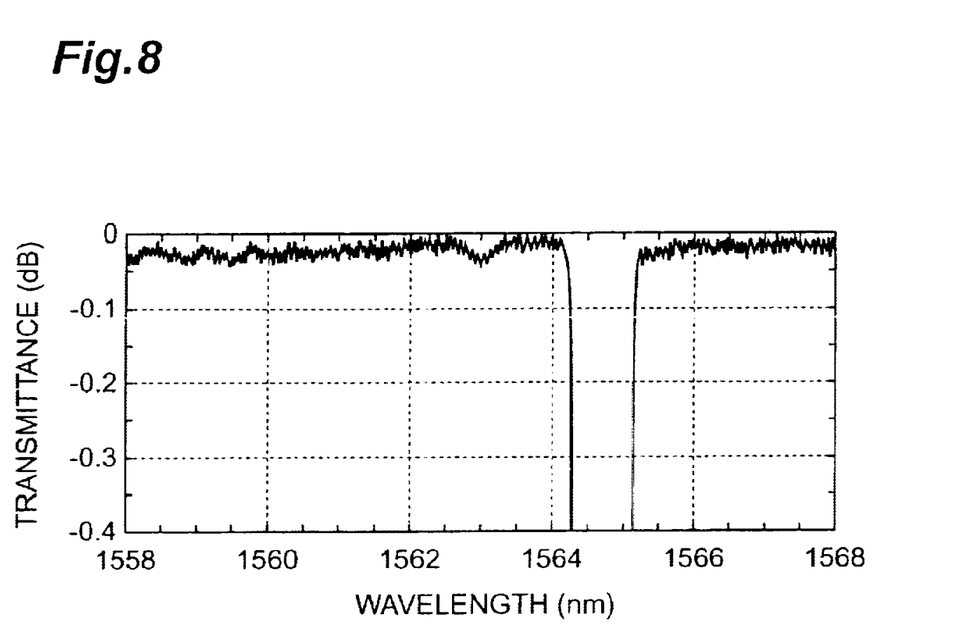
FIG. 8 is a view showing the transmission spectrum of the fiber grating device in accordance with the example.

FIG. 6 is a view showing respective diametric concentration (EPMA count number) distributions of elements in an optical fiber preform used in the fiber grating device in accordance with the example. In FIG. 6, line L1 indicates is the concentration distribution of Ge, whereas line L2 indicates the concentration distribution of F. On the other hand, I indicates the boundary formed at the time of depositing inner cladding, whereas II indicates the boundary formed at the time of depositing core by OVD method. FIG. 7 is a view showing the diametric refractive index difference distribution of the optical fiber for the fiber grating device in accordance with the example. FIG. 8 is a view showing the transmission spectrum of the fiber grating device in accordance with the example. The optical fiber preform used in the example was made according to the above-mentioned second method such that the UV photosensitivity became as uniform as possible over both of the core region and inner cladding region of the optical fiber.

Since the optical fiber preform used in the example is doped with no element having a UV photosensitivity other than Ge, GeO$_2$ may be used alone as one having a UV photosensitivity, whereby the deviation in diametric Ge concentration distribution can be made equal to the deviation in UV photosensitivity distribution. As can be seen from FIG. 6, the deviation in Ge concentration distribution was ±10% or less, and the deviation in UV photosensitivity distribution was also ±10% or less. Also, as shown in FIG. 6, the Ge concentration dropped in the vicinity of the boundary between the core part and inner cladding part (area I corresponding to the boundary formed at the time of depositing inner cladding), thereby yielding a deviation exceeding ±10% in this area. However, since Ge diffuses upon heating at the time when the optical fiber preform is drawn so as to make the optical fiber, deviations in the diametric width and concentration in the area where the Ge concentration drops are reduced. Also, in the optical fiber having an outer diameter of 125 μm, the diametric width in the area where the Ge concentration drops is not greater than 1 μm. Even if a Ge concentration drop area having a diametric width of 1 μm or less exists in the state of optical fiber, it can be neglected since it is smaller than the wavelength used in optical communications and thus is unproblematic in terms-of characteristics of the diffraction grating.

Since the optical fiber in accordance with the example is based on silica glass while the core is doped with no refractive index raising material other than Ge, the refractive index distribution, Ge concentration distribution, and UV photosensitivity distribution in the core can be made equal to each other, and their deviations can be the same. As can be seen from FIG. 7, the deviation of refractive index difference in the core portion was ±5% or less. The reason why the deviation (±5% or less) of refractive index in optical fiber is about ½ of the deviation (±10% or less) of Ge concentration distribution in the optical fiber preform is assumed to be because of the diffusion of Ge upon heating at the time of drawing.

In the fiber grating device in accordance with the example, the outer diameter of the core region was 8.5 μm, the outer diameter of the inner cladding region was 34 μm, and the relative refractive index difference of the core region was 0.33%. As shown in FIG. 8, the transmission spectrum of the fiber grating device in accordance with the example was such that the reflection center wavelength was near 1564.7 nm, the reflection bandwidth (yielding a transmissivity of −30 dB) was 0.4 nm, and the maximum value of cladding mode coupling loss was about 0.04 dB or less.

Figure 9:
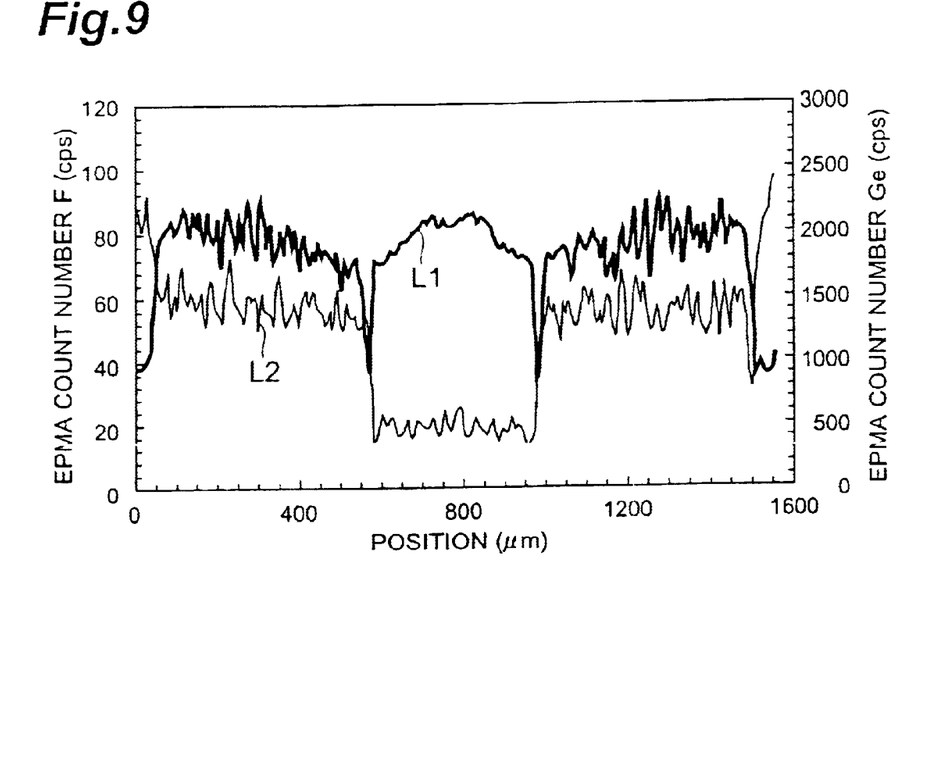
FIG. 9 is a view showing respective diametric concentration distributions of elements of an optical fiber preform for the fiber grating device in accordance with a comparative example.
Figure 10:
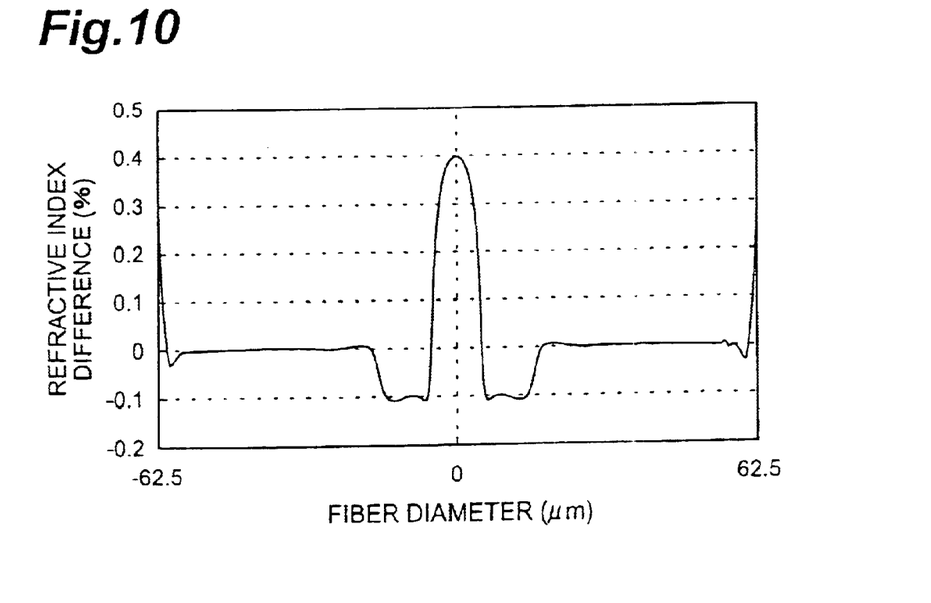
FIG. 10 is a view showing the diametric refractive index distribution of the optical fiber for the fiber grating device in accordance with the comparative example.
Figure 11:
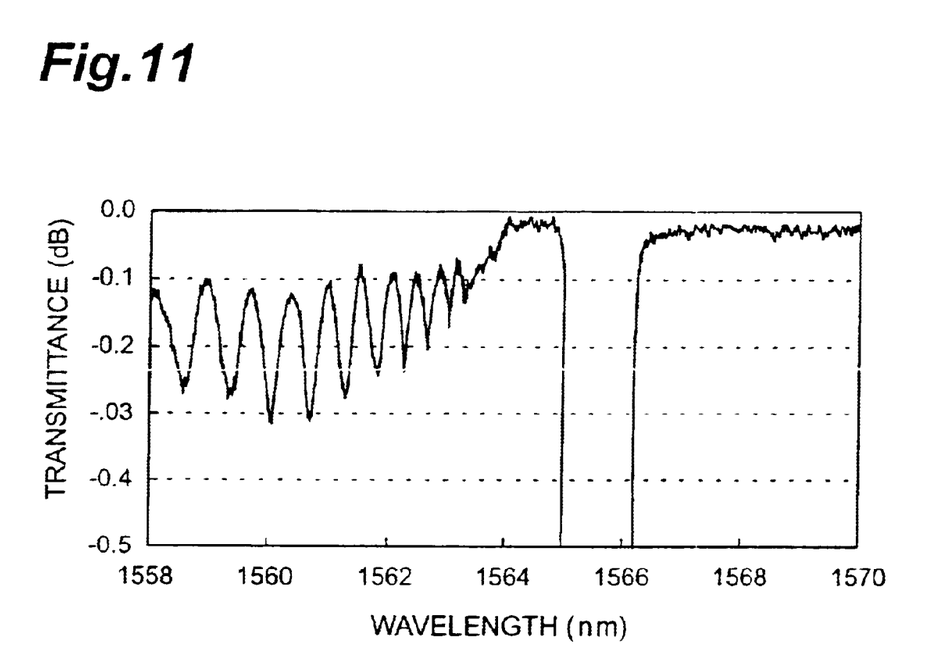
FIG. 11 is a view showing the transmission spectrum of the fiber grating device in accordance with the comparative example.

FIG. 9 is a view showing respective concentration (EPMA count number) distributions of elements in the diametric direction of an optical fiber preform used in the fiber grating device in accordance with a comparative example. In FIG. 9, line L1 indicates the concentration distribution of Ge, whereas line L2 indicates the concentration distribution of F. FIG. 10 is a view showing the diametric refractive index difference distribution of the optical fiber for the fiber grating device in accordance with the comparative example. FIG. 11 is a view showing the transmission spectrum of the fiber grating device in accordance with the comparative example. In each of the core region and inner cladding region of the optical fiber in the optical fiber preform used in the comparative example, the deviation of Ge concentration distribution exceeded ±10%, and the deviation of UV photosensitivity also exceeded ±10%. The maximum value of cladding mode coupling loss in the fiber grating device in accordance with the comparative example was about 0.3 dB.

As in the foregoing, since the deviation of UV photosensitivity in the inner cladding region 12 is ±10% or less in the inner cladding region 12 in the optical fiber 10, the maximum value of cladding mode coupling loss in the fiber grating device 1 is reduced to about 0.1 dB in the embodiment. Also, since the difference between the average value of UV photosensitivity in the core region 11 and the average value of UV photosensitivity in the inner cladding region 12 is 10% or less in the optical fiber 10, or the deviation in UV photosensitivity over both of the core region 11 and inner cladding region 12 is ±10% or less (more preferably ±5% or less), the maximum value of cladding mode coupling loss in the fiber grating device 1 is further lowered.

Though the above-mentioned embodiment relates to the case doped with $GeO_2$, the cladding mode coupling loss can also be lowered by suppressing the deviation in UV photosensitivity distribution in the case doped with materials yielding UV photosensitivity such as $B_2O_3$ and $P_2O_5$.

According to the present invention, as explained in detail in the foregoing, not only the core region but also the inner cladding region surrounding the core region has a UV photosensitivity, whereas the deviation in UV photosensitivity in the inner cladding region is ±10% or less, whereby the cladding mode coupling loss of fiber grating device can fully be reduced. Also, since the difference between the average value of UV photosensitivity in the core region and the average value of UV photosensitivity in the inner cladding region is 10% or less, or the deviation in UV photosensitivity over both of the core region and inner cladding region is ±10% or less (more preferably ±5% or less), the maximum value of cladding mode coupling loss in the fiber grating device can further be reduced.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber comprising:

a core region having a first refractive index with a UV photosensitivity;

an inner cladding region surrounding said core region and having a second refractive index lower than said first refractive index with a UV photosensitivity; and an outer cladding region surrounding said inner cladding region and having a third refractive index lower than said first refractive index;

wherein said UV photosensitivity in said inner cladding region has a deviation of ±10% or less.

2. An optical fiber according to claim 1, wherein the difference between an average value of UV photosensitivity in said core region and an average value of UV photosensitivity in said inner cladding region is 10% or less.

3. An optical fiber according to claim 1, wherein the deviation of UV photosensitivity over both of said core region and said inner cladding region is ±10% or less.

4. An optical fiber according to claim 1, wherein the deviation of UV photosensitivity over both of said core region and said inner cladding region is ±5% or less.

5. A fiber grating device comprising the optical fiber according to claim 1, said optical fiber having a refractive index modulation formed in a predetermined area along a longitudinal direction thereof.

* * * * *